(12) United States Patent  (10) Patent No.: US 7,487,538 B2
Mok  (45) Date of Patent: Feb. 3, 2009

(54) SECURITY SYSTEM

(76) Inventor: Steven Siong Cheak Mok, Jalan Tack Whye #04-75, Singapore (SG) 680154

( * ) Notice: Subject to any disclaimer, the term of this patent is extended or adjusted under 35 U.S.C. 154(b) by 538 days.

(21) Appl. No.: 10/046,042

(22) Filed: Nov. 19, 2001

(65) Prior Publication Data

US 2003/0097586 A1    May 22, 2003

(51) Int. Cl.
*G06F 7/04*    (2006.01)
(52) U.S. Cl. .......................... 726/7; 340/5.26
(58) Field of Classification Search .............. 713/182, 713/185; 340/870, 539, 5, 5.26; 715/742; 380/262; 455/66.1, 100; 726/7
See application file for complete search history.

(56) References Cited

U.S. PATENT DOCUMENTS

| | | | | |
|---|---|---|---|---|
| 4,691,202 A * | 9/1987 | Denne et al. | ................ | 340/10.2 |
| 4,746,830 A * | 5/1988 | Holland | .................. | 310/313 D |
| 4,952,928 A * | 8/1990 | Carroll et al. | ............ | 340/10.41 |
| 5,331,580 A * | 7/1994 | Miller et al. | ................ | 708/173 |
| 5,629,981 A * | 5/1997 | Nerlikar | ..................... | 713/168 |
| 5,640,002 A * | 6/1997 | Ruppert et al. | ......... | 235/462.46 |
| 5,768,140 A * | 6/1998 | Swartz et al. | ............... | 700/225 |
| 5,787,174 A * | 7/1998 | Tuttle | ......................... | 713/189 |
| 5,864,580 A * | 1/1999 | Lowe et al. | .................. | 375/222 |
| 5,963,134 A * | 10/1999 | Bowers et al. | ........... | 340/572.1 |
| 6,393,045 B1 * | 5/2002 | Belcher et al. | .............. | 375/130 |
| 6,512,478 B1 * | 1/2003 | Chien | .................... | 342/357.09 |
| 6,513,015 B2 * | 1/2003 | Ogasawara | .................. | 705/26 |
| 6,744,811 B1 * | 6/2004 | Kantschuk | .................. | 375/222 |
| 6,958,677 B1 * | 10/2005 | Carter | ....................... | 340/10.1 |
| 7,054,296 B1 * | 5/2006 | Sorrells et al. | ............. | 370/338 |

OTHER PUBLICATIONS

American Heritage College Dictionary, Copyright 2002, Houghton Mifflin Company, Fourth Edition, p. 1085.*

* cited by examiner

*Primary Examiner*—Gilberto Barron, Jr.
*Assistant Examiner*—Virgil Herring
(74) *Attorney, Agent, or Firm*—Hancock Hughey LLP

(57) ABSTRACT

A security system for facilitating transponder carrier identification and tracking within a secure area comprising an RF transponder having a memory in which is stored a unique identifier; the transponder including a transmitter to transmit the unique identifier; a transponder writer operable to send a replacement unique identifier to the transponder, the transponder replacing the identifier in the transponder memory with the replacement identifier; a transponder reader to receive from the transponder at least the unique identifier of the transponder; such that the transponder reader interrogates the transponder and, in response to the interrogation, receives from the transponder at least the unique identifier of the transponder; wherein the location of the transponder is determined from the location of the transponder reader.

22 Claims, 11 Drawing Sheets

SECURITY SYSTEM

FIELD OF THE INVENTION

This invention relates to a security system and more particularly to a security management system for facilitating personnel identification and tracking within a secure area.

BACKGROUND

Conventional security management systems furnish a secure area with a network of transponder readers operable to interrogate transponders within their range and obtain from the transponders a unique identifier associated therewith. Users carry uniquely encoded transponders within the secure area.

Such security systems are inflexible and require a complex infrastructure in which security verification systems are incorporated within each transponder reader. One major drawback of such systems is that a stolen transponder can be used within the secure area and does not register as being stolen. Transponders are deemed valid until the unique transponder code is cancelled.

SUMMARY OF THE INVENTION

It is an object of the present invention to seek to provide a flexible security management solution requiring a minimum of system architecture.

Accordingly, in a first aspect the invention provides a security system for facilitating transponder carrier identification and tracking within a secure area comprising: an RF transponder having a memory in which is stored a unique identifier; the transponder including a transmitter to transmit the unique identifier; a transponder writer operable to send a replacement unique identifier to the transponder, the transponder replacing the identifier in the transponder memory with the replacement identifier; a transponder reader to receive from the transponder at least the unique identifier of the transponder; such that the transponder reader interrogates the transponder and, in response to the interrogation, receives from the transponder at least the unique identifier of the transponder; wherein the location of the transponder is determined from the location of the transponder reader.

Advantageously, the transponder has a fixed unit identifier serving to identify the transponder, the fixed unit identifier being a separate identifier to the unique identifier.

Preferably, the unique identifier comprises an identity code.

Conveniently, the unique identifier is encrypted and assigned by a security processor.

Advantageously, the transponder includes a transmitter to transmit the unique identifier.

Preferably, the transmitter is a contactless transmitter operable to transmit RF signals.

Conveniently, the transmitter is a contact transmitter operable to send signals to a unit in contact with the transponder.

Advantageously, the security system further comprises a transponder reader to receive from the transponder at least the unique identifier of the transponder.

Preferably, the transponder reader interrogates the transponder and, in response to the interrogation, receives from the transponder at least the unique identifier of the transponder.

Conveniently, the transponder reader is mounted within the secure area and has a location code which provides information as to the location of the transponder reader.

Advantageously, the transponder reader is portable and operable within the secure area.

Preferably, the transponder reader has a predetermined interrogation range such that a transponder within the interrogation range will receive an interrogation signal from the reader and will respond thereto by sending its unique identifier.

Conveniently, the security system further comprises a security processor having an access database setting out access parameters for the secure area and a carrier of a transponder, the security processor being operable to receive information from the transponder reader comprising at least the unique identifier of an interrogated transponder and the location of the transponder reader.

Advantageously, the security processor determines from consultation of the access database whether the carrier is authorized to be in the vicinity of the interrogating transponder reader and further determines what, if any, action needs to be taken.

Preferably, the security system further comprises an actuator controllable by the security processor to effect operation of a device in response to a condition determined by the security processor.

Conveniently, the device activated by the actuator is selected from the group consisting of: an image capture device; an alarm; an alert system; a lock; an emergency door release; a speaker; and a communication device.

Advantageously, the transponder is configured as a card having a contact terminal.

Preferably, a card reader/writer is provided having a contact region compatible with the card contact terminal, wherein the transponder is addressable by the card reader when the terminal and contact region are in contact with one another.

Conveniently, the card reader/writer is operable to write the replacement unique identifier to the transponder.

Advantageously, the card reader/writer is integrated with an identification authentication device so as to authenticate the identity of a carrier of the transponder prior to writing a replacement unique identifier to the transponder of the carrier.

Preferably, the carrier is selected from the group consisting of: personnel; a vehicle; and a hardware product.

Conveniently, the unique identifier has an expiry time after which the unique identifier is no longer valid.

Advantageously, the system is enabled by one of the following methods: Internet enabled, wireless enabled, hardwired, intranet enabled and combinations thereof.

In a second aspect the invention provides an RF transponder for use in a security system for facilitating transponder carrier identification and tracking within a secure area comprising: a first memory in which is stored a replaceable unique identifier; and a transmitter operable to send the unique identifier in response to an interrogation signal from a transponder reader; wherein the location of the transponder is determined from the location of the transponder reader.

In a third aspect the invention provides an RF transponder reader operable to send an interrogation signal to an RF transponder having a unique identifier and receive from the transponder, in response to the interrogation signal, the unique identifier, the reader being operable to transmit the unique identifier to a security processor for identity verification wherein the location of the transponder is determined from the location of the transponder reader.

Preferably, the reader is a portable unit.

Conveniently, the reader is integrated with a data archiving system.

Advantageously, the data archiving system is a personal digital assistant.

Preferably, the reader incorporates a cellular telephone system.

In a fourth aspect the invention provides a method of identity verification comprising the steps of: interrogating an RF transponder with an interrogation signal from a transponder reader; receiving a unique identifier from the transponder provided in response to the interrogation signal; authenticating the identity of a user carrying the transponder; assigning a replacement unique identifier; and writing the replacement unique identifier to the transponder to replace the received unique identifier; locating the transponder from the location of the transponder reader.

In order that the present invention may be more readily understood, embodiments thereof will now be described, by way of example, with reference to the accompanying drawings.

BRIEF DESCRIPTION OF DRAWINGS

FIG. 3b is a schematic plan view of the transponder of FIG. 3a;

FIG. 4 is a block diagram of a transponder reader/writer, for use with the transponder of FIG. 3a;

FIG. 5 is a block diagram of a portable transponder reader embodying the present invention for use with the transponder of FIG. 3a;

FIG. 6a is a block diagram of a transponder reader embodying the present invention for use with the transponder of FIG. 3a;

DESCRIPTION OF PREFERRED EMBODIMENT

Figure 1:
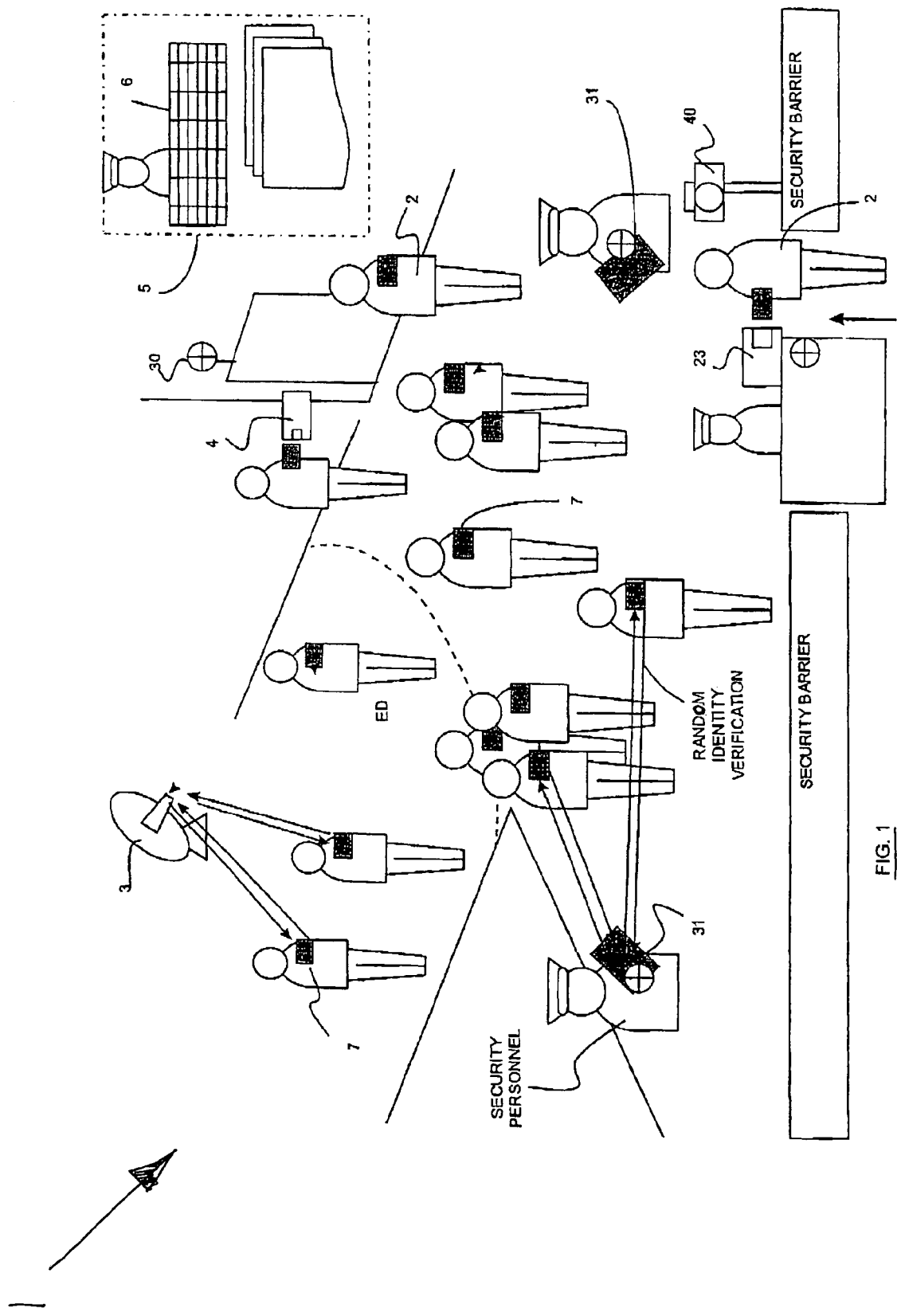
FIG. 1 is a schematic representation of a security system embodying the present invention.

Referring to the drawings, a security system embodying the present invention is described below in relation to a secure area 1 which is divided into a number of rooms or regions, to which authorized users 2 are allowed access. The nature of the access provided to users 2 is intended to be as flexible as possible, whilst at the same time, maintaining security to a required level. For clarity and convenience, reference numerals used throughout the following description have been applied consistently. Therefore, similar items used in different embodiment defined by different figures will be identified by similar reference numerals.

A secure area 1 is provided with a plurality of transponder readers 3 each of which has a detection or interrogation range. It is intended that the number of blind spots, if any, is minimized in the secure area so the coverage provided by the transponder readers 3 is substantially blanket coverage. Further or additional coverage is provided by means of additional transponder readers 4 at access points such as doors, gates and/or barriers and hand-held units carried by security personnel as shown in FIG. 1.

A central monitoring means comprises a security processor 5 which includes amongst other items an access database 6 which sets out for respective users of the system the access parameters attributable to each user and also sets out the access authority for respective regions, rooms, or areas within the secure area. The security processor 5 also maintains a log of user locations so as to facilitate user tracking within the secure area 1. Further, the security processor incorporates an encryption/decryption algorithm.

Typically, a "user" 2 refers to an individual person to whom a transponder 7 has been allocated. Transponders 7 are radio frequency (RF) transponders, 7 and are shown in more detail in FIG. 3a. Although the illustrated transponder 7 is an active transponder 7 having its own battery power, the use of passive transponders such as inductively coupled transponders is also envisaged Active transponders are preferred because of their superior transmission range compared to passive transponders.

Figure 2:
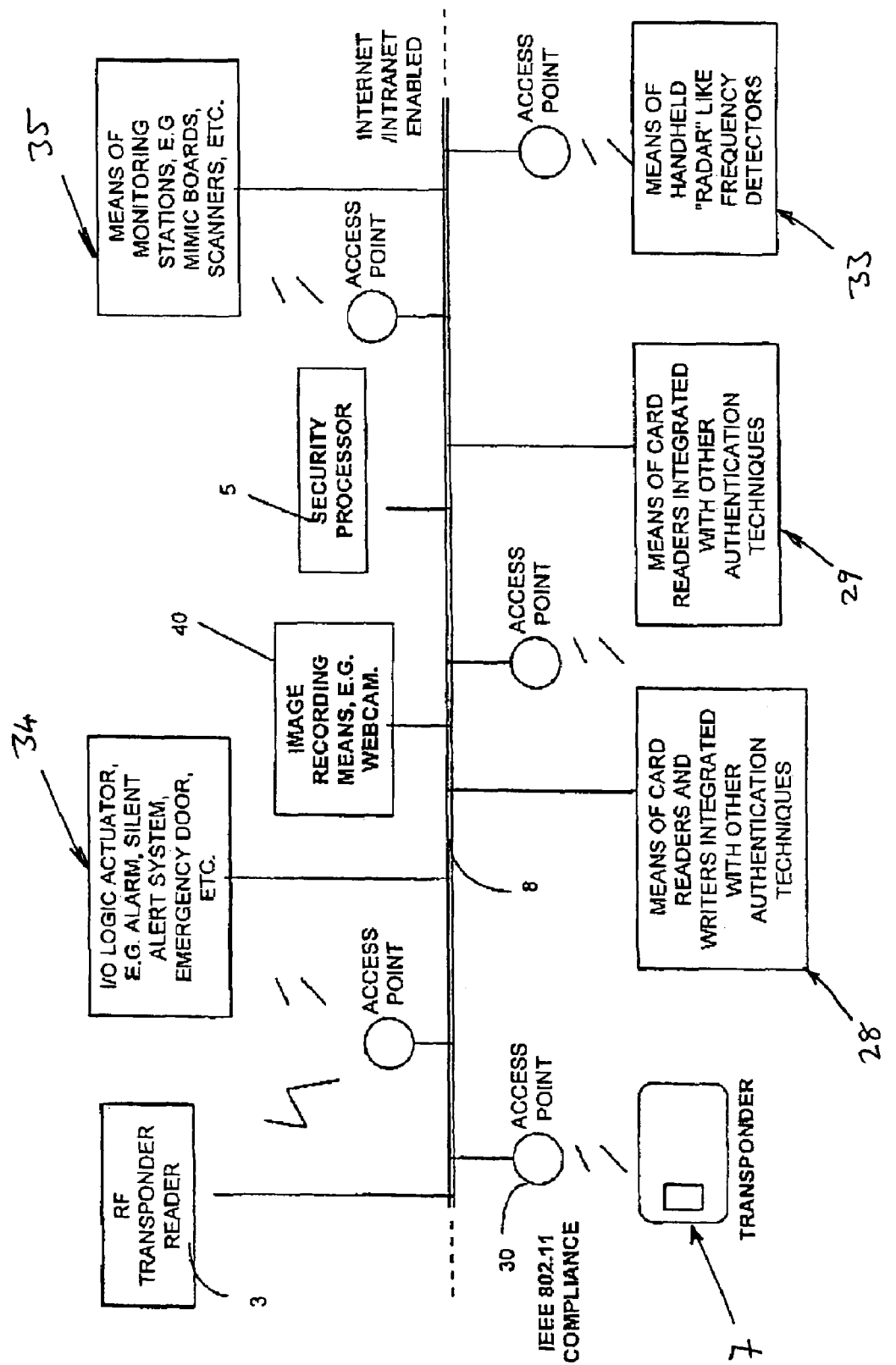
FIG. 2 is a block diagram of the architecture of an exemplary security system embodying the present invention.

Referring to FIG. 2, the block diagram shows an overall system architecture of the system components connected to a common bus 8. In particular, there is shown in communication with said bus 8, an I/O Logic Actuator 34, which may represent an alarm, silent alert system emergency door etc, an image recording means 40 such as a "webcam", a security processor 5 and a means of monitoring stations 35, such as mimic boards, scanners etc. Further, the components in communication with the bus 8 include means of cards readers and writers integrated with other authentication techniques 28, means of card readers integrated with other authentication techniques 29 and means of handheld "radar like" frequency detectors 33. Although the components are shown in FIG. 2 as being hard-wired, it is also possible for connection to the bus 8 to be effected by a wireless connection, intranet connection, Internet connection or the like.

Figure 3A:
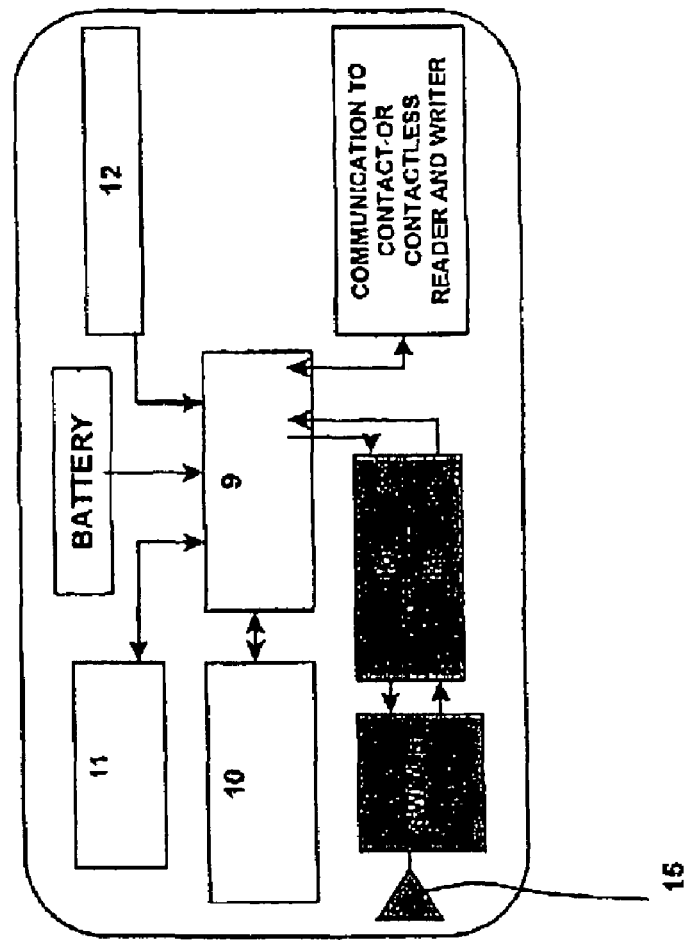
FIG. 3a is a block diagram of a transponder embodying the present invention.
Figure 3B:
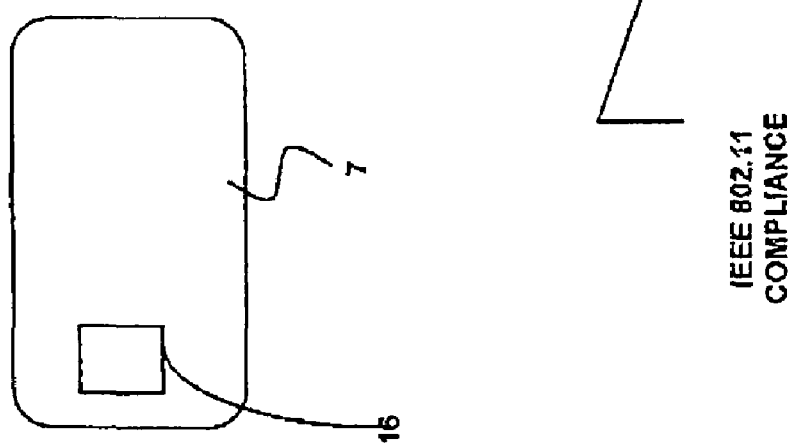

The basic components of the security system are as follows:

RF transponders: As shown in FIG. 3a, each RF transponder 7 is configured as a card upon which a micro-controller 9 is mounted for executing a transponder control program held in a ROM 10 and being connected to a memory 11 storing a renewable identification number referred to hereinafter as a unique identifier; and another memory or register 12 holding a fixed unit identifier number. Each transponder 7 is also provided with a transmitter 13 and receiver 14 connected to a built-in antenna 15. With reference to FIG. 3b, further connectivity to the transponder 7 is provided by a contact region 16 on a surface of the card to facilitate communication with the transponder 7 when in contact with a contact card reader. The transponders are operable upon receipt of an interrogation signal from a reader to transmit the unique identifier.

The unique identifier held in the memory 11 comprises an encrypted identity code assigned to the transponder by the security processor. The transponder itself does not include any encryption/decryption functionality serving to simplify the transponder design All encryption/decryption functions are carried out by the security processor 5. The fixed unit identifier for each transponder 7 cannot be altered whereas the unique identifier held in the memory 11 of each transponder can be replaced/overwritten.

Figure 6A:
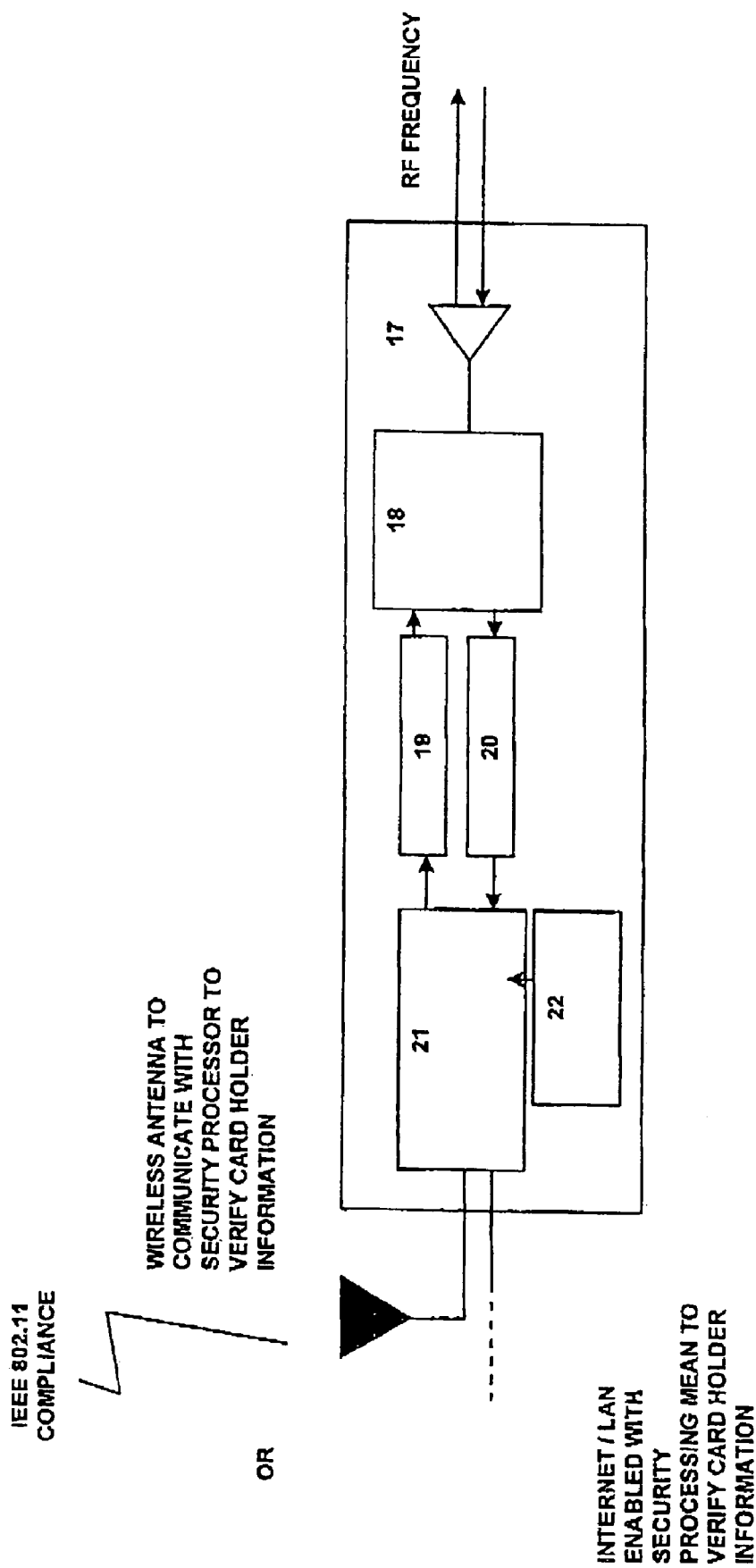

Transponder Readers: Transponder readers 3 are implemented in a number of ways and can be provided with further functionality. However, the most basic form of transponder reader is as shown in FIG. 6a and comprises an antenna 17 for transmitting and receiving signals to/from the transponders 7 connected by an automatic switch 18 to respective transmitter 19 and receiver circuits 20 and then to a microprocessor 21 coupled to an oscillator 22 for transmitting received information from the transponders 7 to the security processor 5. Preferably, the uplink to the security processor 5 is at a different frequency or uses a different communication standard to the link with the transponder 7 hence the need for the local frequency oscillator 22. The simplest form of transponder reader 3 acts simply as an interrogator and relay. The transponder readers 3 periodically send an interrogation signal to all the transponders 7 within the range of the signal transmitted by the transponder reader 3 and receive signals generated by the transponders 7 in response to receipt of the interrogation signal. The signal sent by the transponders 7 comprises a unique identifier which is relayed, in its encrypted form if encrypted, to the security processor 5.

The transponder readers 3 need not be wirelessly connected to the security processor but can also be hard-wired thereto over the bus 8.

As previously stated, such simple transponder readers 3 interrogate transponders 7 and relay identity codes of interrogated transponders to the security processor 5.

Figure 4:
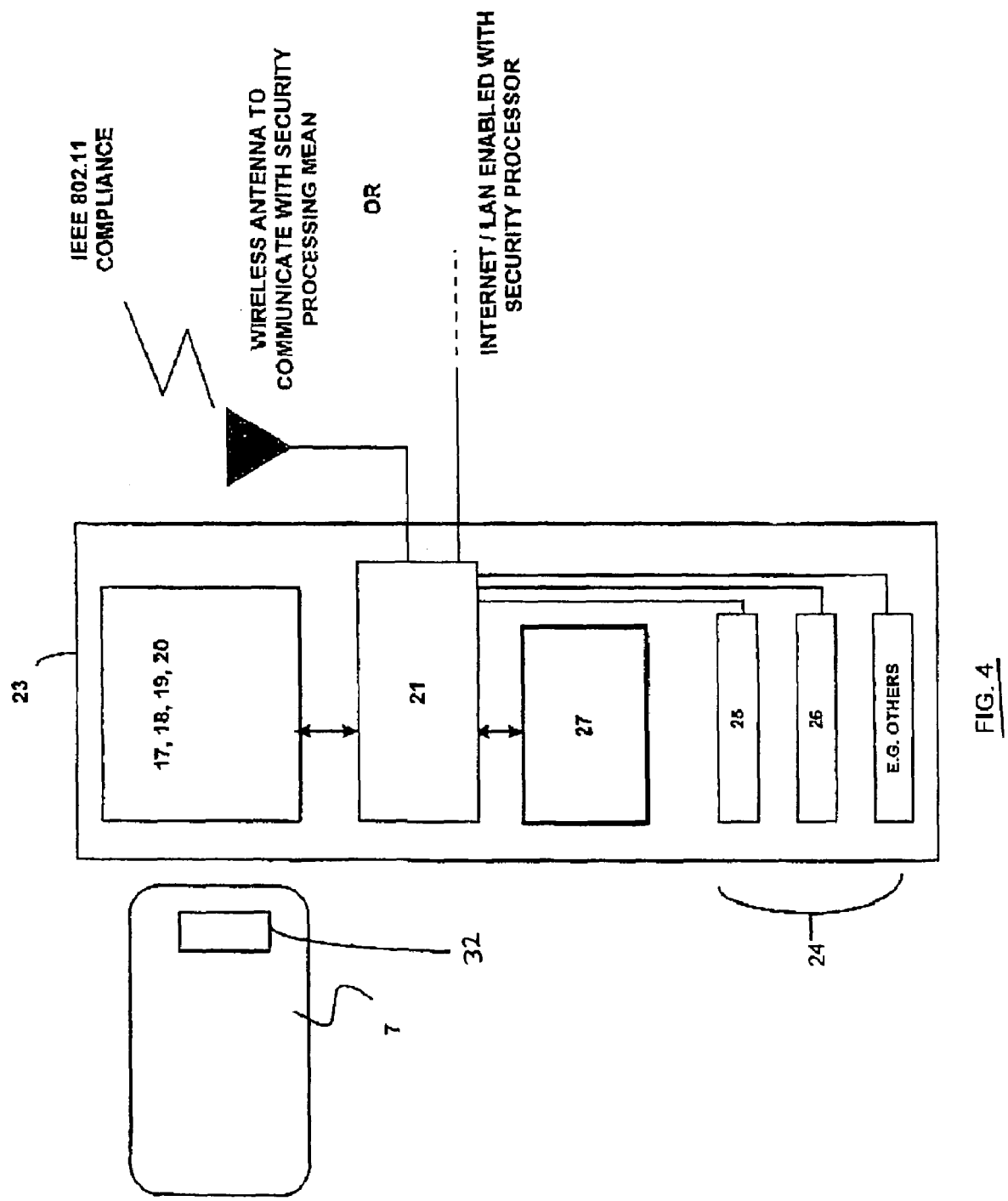

Transponder Reader/Writer: Transponder readers/writers 23 are slightly more complex than transponder readers 3 in that they also incorporate as their name would imply, a writing function, being able to communicate and send further information to the transponders 7. They include the functionality shown for the transponder reader of FIG. 6a, in that they include an antenna 17 for transmitting and receiving signals to/from the transponders 7 connected by an automatic switch 18 to respective transmitter 19 and receiver circuits 20. Further, the transponder readers/writers 23, such as that shown in FIG. 4 are also able to send, in addition to an interrogation signal, a write signal to the transponders 7. The write signal is an encrypted unique identifier supplied to the reader/writer by the security processor 5. The encrypted unique identifier is written to the transponder memory 11 thereby overwriting the existing unique identifier in the memory 11.

As shown in FIG. 4, the transponder reader/writer 23 can be further enhanced by the provision of one or more identification authentication devices 24 such as a keypad 25 for a password entry; a biometric authenticator 26 such as a finger print reader or retinal scan each of which is connected to the reader/writer's central processing unit 21 for communication by the communication bus 8 or wireless connection to the security processor 5.

In FIG. 4, the communication between the transponder 7 and the reader/writer 23 is contactless. The reader/writer 23 can also be configured as a contact reader/writer such that the transponder 7 which is preferably configured as a card would be inserted into a slot provided in the reader/writer 23 to allow a contact region of the transponder card to be contacted by a terminal portion 32 of the reader/writer 23 so as to effect direct contact communication with the card and read the transponder unique identifier and, if necessary, write a new replacement unique identifier to the transponder memory 11.

Additionally, as shown in FIG. 4, an interactive display screen 27 may also be provided on the reader/writer.

The above-mentioned transponder readers 3 and transponder reader/writers 23 are physically mounted around the secure area 1 and at various access points 30 (FIG. 2). Each of the readers 3 and readers/writers 23 is provided with its own identifier so that when its information is transmitted to the security processor 5, the security processor can check on a look-up table or the like, the physical location of each reader 3 and reader/writer 23 as determined by its identifier.

Combining the physical location of the reader 3 and/or readers/writers 23 with the unique identifier of a detected transponder 7 gives the security processor 5 a log of transponder location over a period of time.

Figure 5:
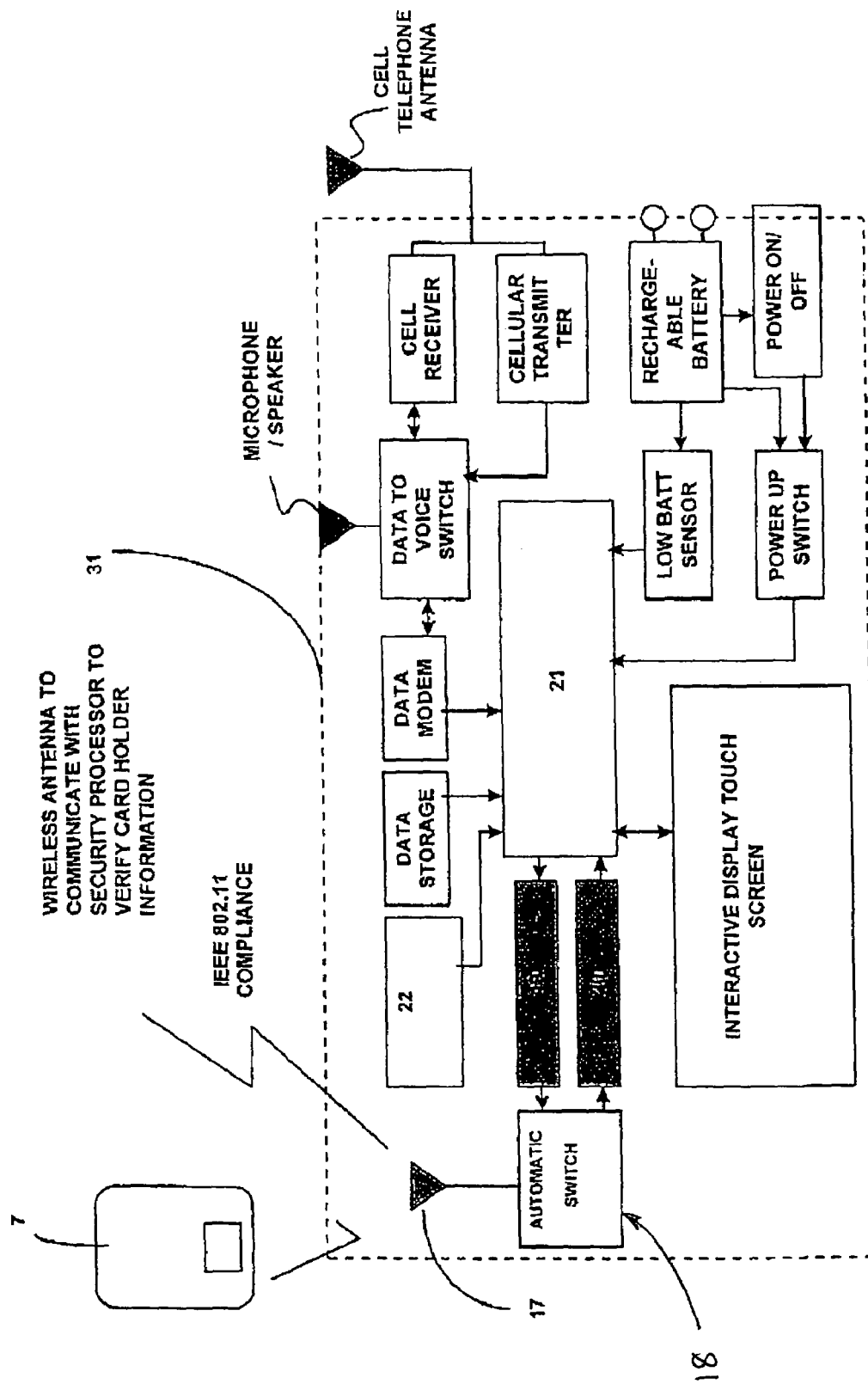

In order to offer further flexibility, the security system also provides portable transponder readers 31 and/or transponder readers/writers 23 for use with a transponder 7. An example of a portable transponder reader 31 is shown in FIG. 5. In addition to the components required for a fixedly mounted transponder reader, such as a microprocessor 21 and oscillator 22, the portable reader 31 is provided with a cellular transmission reception capability to enable communication with the security processor. The cellular transmissions/reception capability also allows the portable reader to be used as a cellular telephone to communication with other portable readers or third parties. Preferably, the portable reader is provided with a rechargeable battery power source and an interactive touch screen display.

The transponder reader of FIG. 6a can be integrated with a motion detector such as a conventionally available infra red motion detector so that it is triggered to send an interrogation signal upon detection of movement within its detection zone so as to determine the identity of the user causing movement Clearly, if the moving object does not have a transponder associated with it which is authorized to be in that area, then an appropriate signal indicating this is sent to the security processor.

The above discussion pre-supposes that a transponder is carried by each authorized user. However, transponders can also be carried by inanimate objects such as vehicles or portable devices such as expensive hardware. The transponder must be carried by the user at all time and visibly seen by the security personnel on duty. Each transponder stores, for sending upon receipt of an interrogation signal at least the encrypted unique identifier associated with the authorized user. In some embodiments, the transponder can send a combination of the unique identifier and the fixed unit identifier.

A user carrying a transponder 7 with an authorized unique identifier is allowed to access certain areas and doors in accordance with predefined authorization and/or access parameters held by the security processor 5.

The authorization parameters shall include exact "start-work" and "stop-work" times of a user; a user authority level; a number of permissible entries of a user at a specific door or gantry; and a security procedure for gaining access to predetermined areas. An attempt to gain access outside these parameters will lead to an output from the security processor to effect actuators to activate one or more of the following: alarms, "silent" alarms (for security personnel) and shutting and/or locking of doors and access points. At the end of a pre-defined working time, a transponder will automatically lose certain accesses to doors, gantries or areas. Accordingly, at the end of a day or at a pre-defined time, the unique identifier of a transponder will be completely disabled. Thus, an authorized user is not allowed to stay within certain restricted zones or compound safeguarded by the security management system after his/her duty.

To re-enter the secure area, the user has to undergo a "check-in" process.

During the "check-in" process at the security checkpoint (refer to FIG. 1), the user's identity will be verified by the security personnel on duty. At the same time, the user is required to insert his/her transponder card into a contact transponder reader/writer for the assignment of a new unique identifier assigned by the security processor and associated with the access parameters stored at the security processor.

This new unique identifier allows the user to re-access the doors, gantries or area he/she is authorized to and allows the user to perform his/her daily duty.

Such an implementation of the security system drastically decreases the chances of intrusion with a stolen card, as well as blocking unauthorized staff from entering restricted zones. Validity durations or expiry times of unique identifiers can be tailored to restricted zones by the authorization parameters held by the security processor but basically, the shorter the validity time of a unique identifier to a door, gantry or area, the more secure the restricted zone.

Figure 6B:
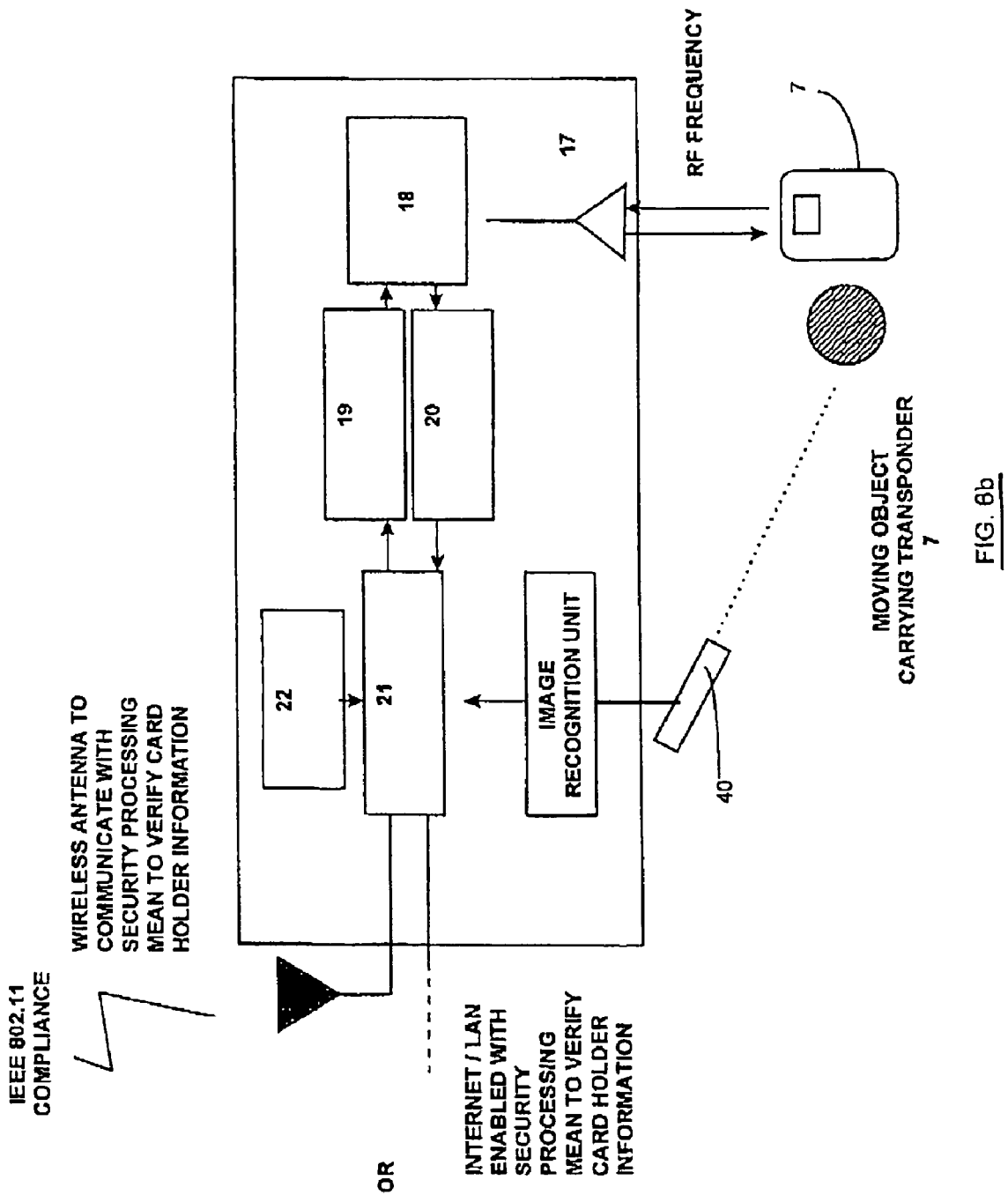
FIG. 6b is a block diagram of the transponder reader of FIG. 6a provided with an immediate recognition unit.

Also, as shown in FIG. 6b, a transponder reader similar to that shown in FIG. 6a may include an immediate recognition unit, such the image of the entire "check-in" process for each transponder 7 is recorded by an image capture device 40 such as a CCD camera or the like, is transferred using the transponder reader and stored by the security processor in an archive.

Next, in the compound safeguarded by the security management system, transponder readers are installed which have a predetermined detection or interrogation range. The role of the transponder readers is purely to receive the encrypted unique identifier and relay the same to the security processor for identity verification and to update a log of transponder location and movement. By not integrating a built-in security verification system in each transponder reader, like other conventional security systems, fabrication costs are reduced to a minimum. Ultimately, this makes for an affordable security management system yet provided with blanket coverage.

Besides, the compound is further patrolled by security personnel, who are each equipped with a portable transponder reader. Ideally, said portable transponder reader is integrated with an RF transponder reader/writer; cellular telephone system; and security data archiving. Preferably, the detection range is 5 meters or above.

Transponder readers are also provided at access points such as doors, integrated into the security management system. This is used to verify the unique identifier of a transponder at a door or a gantry. The reader sends the received unique identifier to the security processor for verification against the authorization parameters via a wireless communication system.

The security management system allows security personnel to monitor and track the positions of all transponders within the secure area with reference to the reader identifiers and the transponder unique identifiers.

The security processor is the central identity verification database, which provides related information and photographs of a transponder holder, a log of a transponder as well as the present location of a transponder. Also, it activates input/output actuators in response to the pre-defined authorization parameters.

If an intruder is detected, instructions are transmitted to all portable transponder readers and the checkpoint(s). Also, information relating to the particular transponder and the holder thereof, such as last location detected by detecting mean, track records of the transponder, personal information of transponder holder and a snap-shot of transponder holder's image during the latest check-in, are enclosed to assist the patrolling security personnel in identifying the intruder.

Furthermore, the particular unique identifier is immediately disabled and input/output logics for shutting doors are activated.

FIG. 2 depicts an overview of security management system architecture. Examples of the present invention provide a unique security management system for authenticating and, tracking people as well as vehicles in public areas or high security zones. Public areas in the present context includes secure workplace environments, airports, banks, tourist spots, shopping mall, etc. Likewise, high security zones include military bases and hazardous material storage areas.

The system can be hardwired, Internet enabled, intranet enabled, wireless enabled or in any combination thereof.

FIGS. 7, 8, 9 and 10 outline related process flows of the security management system. Said process flows are adequate for the major components in the system to carry out their roles as shown in FIGS. 1 and 2 and described in relation thereto. Therefore, it should not be limited to the proposed process flows if additional components are integrated in the system.

Figure 7:
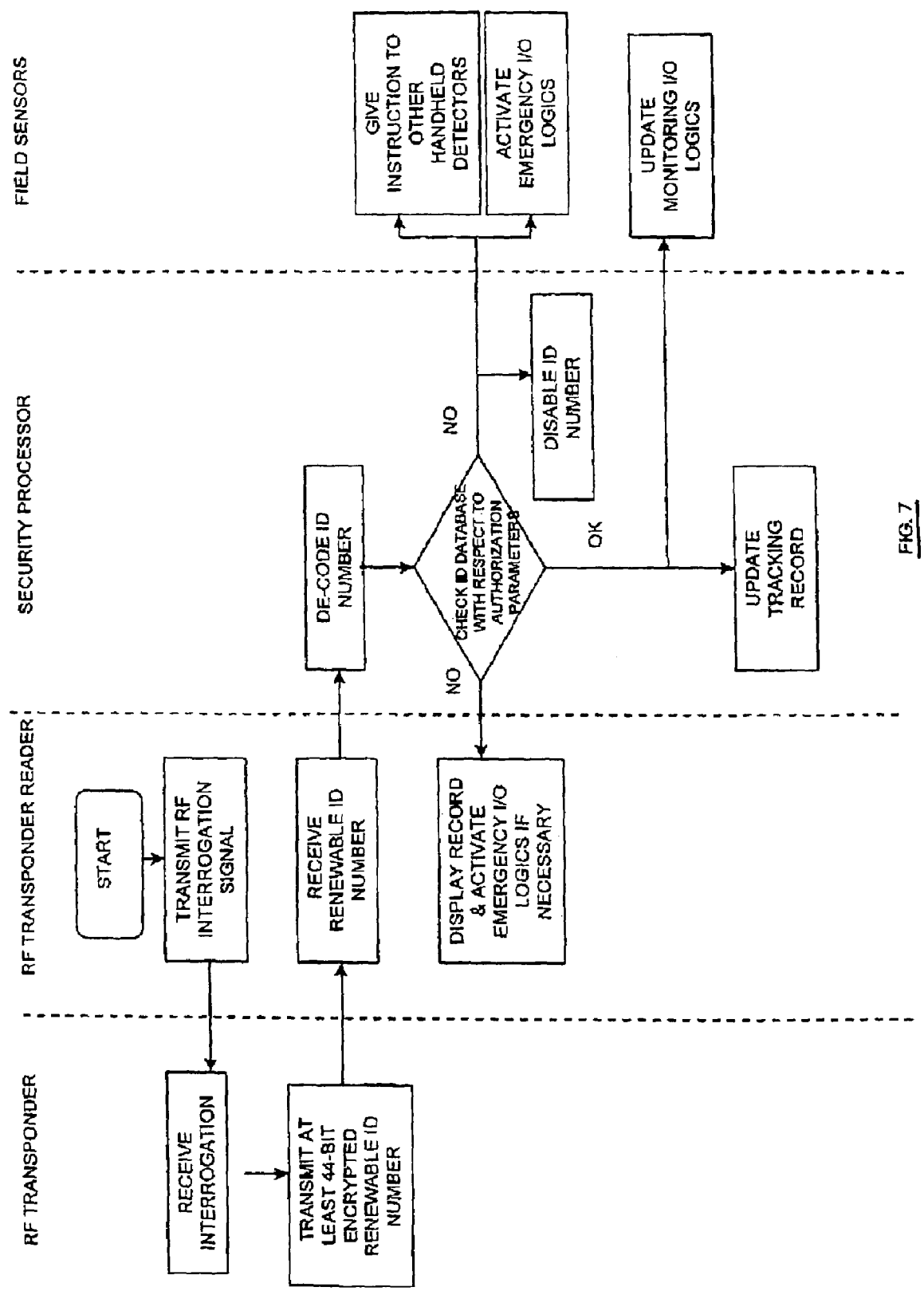
FIG. 7 is flow diagram of one possible mode of operation of the security system embodying the present invention.

In FIG. 7, the process flow of detecting a transponder is shown. In the security management system, a detecting mean periodically transmits an interrogation signal. The interrogation signal is received by the transponders falling within range of the transponder reader. This prompts the transponder to transmit an encrypted unique identifier to the reader.

Next, the reader receives the unique identifier and via the Internet, intranet or wireless communication, the detected unique identifier is then transferred to the security processor where the unique identifier is de-coded. It is subsequently verified against the identity database with respect to pre-defined authorization parameters.

If a negative result is obtained, input/output signals will immediately be sent to activate emergency input/output logics of field sensors and if necessary, display records and give specific instructions to portable transponder readers. The particular unique identifier will be disabled and all subsequent movements of the particular transponder will be recorded.

On the other hand, if a positive result is obtained, the tracking record or log of the particular unique identifier will be updated. Besides, an input/output signal will also be sent to update the monitoring means in the field.

Figure 8:
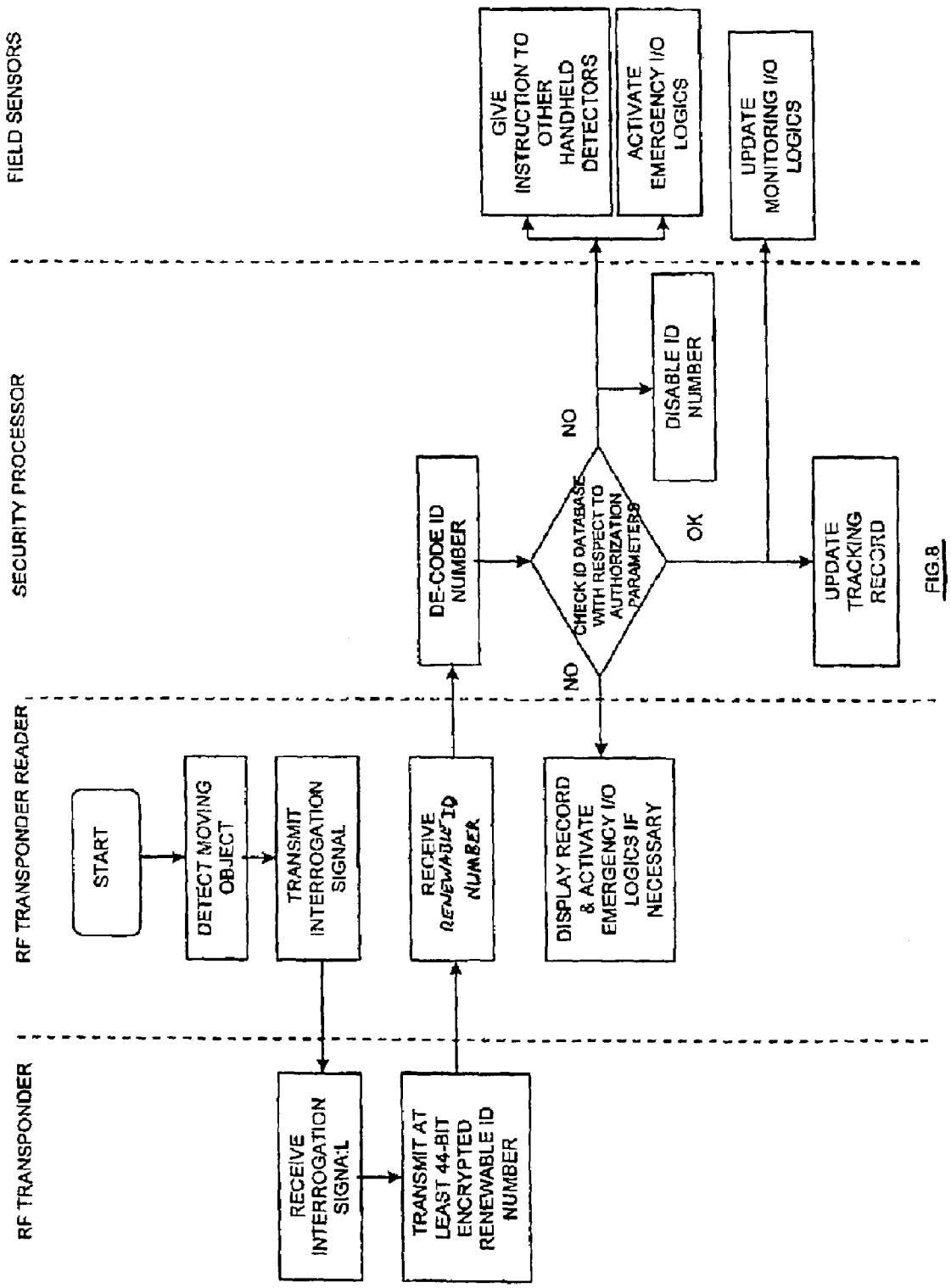
FIG. 8 is a flow diagram of a mode of operation of a security system embodying the present invention.

In FIG. 8, the process flow of an integrated motion detector and transponder reader is shown. The process flow is similar to FIG. 7 except that the device is in standby mode until activated by the motion detector identifying a moving object.

Figure 9:
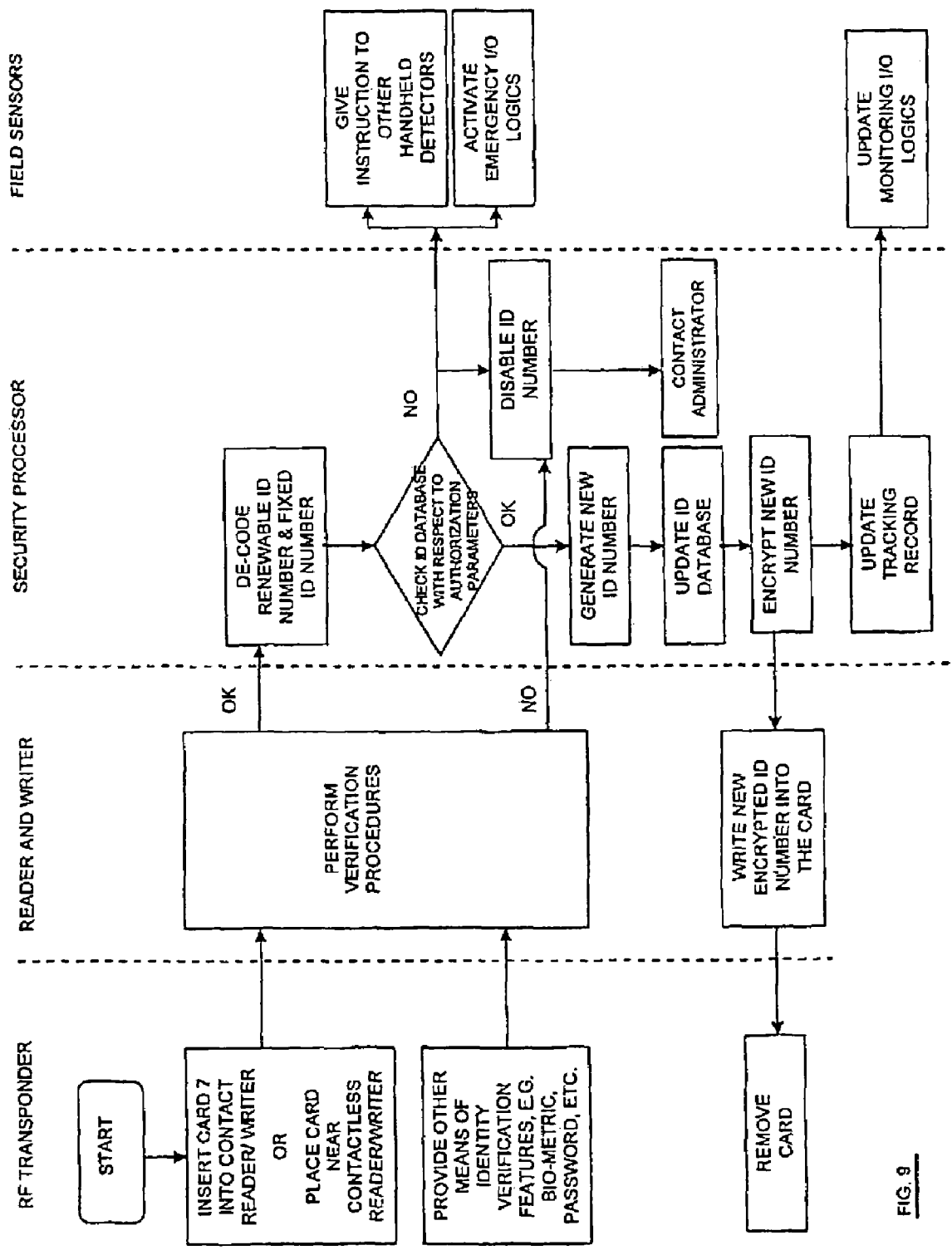
FIG. 9 is a flow diagram illustrating a mode of operation of the security system embodying the present invention.

In FIG. 9, the process flow of writing a new replacement unique identifier to the transponder is shown. To implement a better security procedure to a restricted zone, a unique identifier should ideally expire within a specified time. In this example, a transponder can be programmed such that, its unique identifier will expire after one day (for example). The user is then required to renew or obtain a fresh identity number via a transponder reader and writer.

By inserting a transponder card (for a contact reader/writer) or coming into close proximity with (for a contactless reader/writer) a reader/writer and subsequently performing some other means of identity verification procedure, such as biometric and password, the reader/writer will execute its verification procedures. If a negative result is obtained, the unique identifier will immediately be disabled and a security administrator will be activated. If a positive result is achieved, then this prompts the transfer of the read and encrypted unique identifier to the security management system via the Internet, intranet or wireless communication. Next, the unique identifier is decrypted and verified against the identity database with respect to pre-defined authorization parameters.

If a negative result is obtained, input/output signals will immediately be sent to activate emergency input/output logics of field sensors, as well as give specific instruction to other handheld detectors. The particular unique identifier will be disabled and all subsequent movements of the particular transponder will be recorded.

On the other hand, if a positive result is obtained, a new unique identifier will be generated by the security processor 5 and the identity and access databases will be updated. Following that, said new unique identifier will be encrypted by the security processor 5, transferred to the reader/writer 23 and written into the transponder memory 11 in place of the previously stored unique identifier.

For position tracking purpose, the tracking record of the particular unique identifier will be updated. An input/output signal will also be sent to update the monitoring means in the field.

Figure 10:
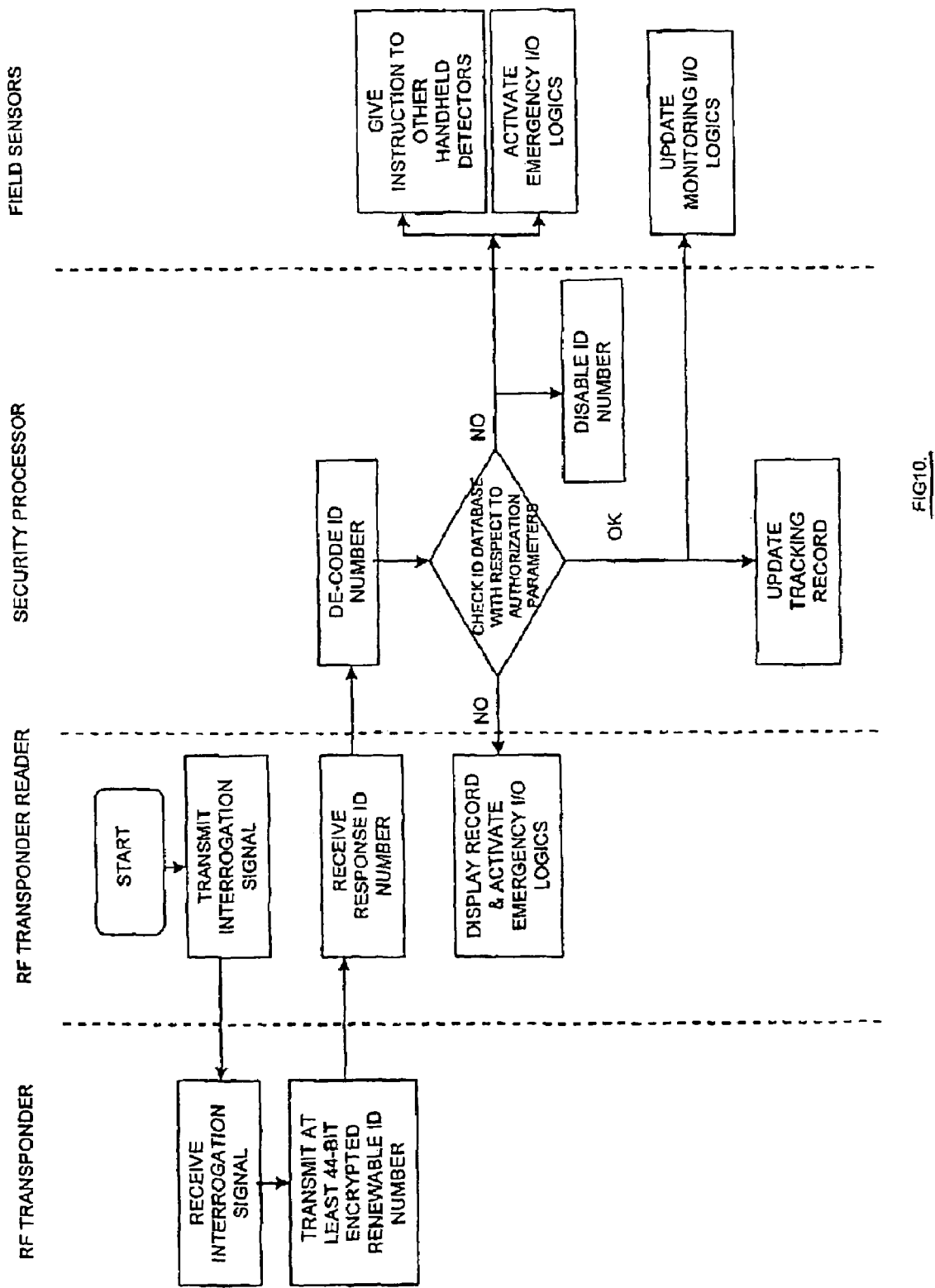
FIG. 10 is a flow diagram illustrating operation of a handheld transponder for use with a security system embodying the present invention.

In FIG. 10, the process flow for a portable transponder reader is shown. The process flow is similar to that of a simple transponder reader. However, said detecting mean is a portable security unit. It is specially designed for security personnel to perform random verification on the users within the restricted zone. This portable transponder reader has a built-in standard cellular telephone system for communications between handheld units and a central dispatch station.

In the present specification "comprises" means "includes" and "comprising" means "including".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A security system for facilitating transponder carrier identification and tracking within a secure area, said secure area including regions requiring different access authority, said system comprising:
   an RF transponder having a memory in which is stored a unique identifier;
   the transponder including a transmitter to transmit the unique identifier;
   a transponder reader to receive from the transponder at least the unique identifier of the transponder; such that the transponder reader interrogates the transponder and, in response to the interrogation, receives from the transponder at least the unique identifier of the transponder and consequently, the location of the transponder is determined from the location of the transponder reader; and
   a security processor having an access database setting out access parameters for the regions and a carrier of the transponder, the security processor being operable to receive information from the transponder reader comprising at least the unique identifier of an interrogated transponder and the location of the transponder reader;
   the security processor capable of determining, from consultation of the access database, whether the carrier is authorized to be in the region corresponding to the interrogating transponder reader; wherein
   the security processor is configured to send a replacement unique identifier to the transponder from a transponder writer, the transponder replacing the identifier in the transponder memory with the replacement identifier, following a positive authorization.

2. A security system according to claim 1, wherein the transponder has a fixed unit identifier serving to identify the transponder, the fixed unit identifier being a separate identifier to the unique identifier.

3. A security system according to claim 2, wherein the unique identifier comprises an identity code.

4. A security system according to claim 1, wherein the unique identifier is encrypted and assigned by a security processor.

5. A security system according to claim 1, wherein the transmitter is a contactless transmitter operable to transmit RF signals.

6. A security system according to claim 1, wherein the transmitter is a contact transmitter operable to send signals to a unit in contact with the transponder.

7. A security system according to claim 1, wherein the transponder reader is mounted within the secure area and has a location code which provides information as to the location of the transponder reader.

8. A security system according to claim 6, wherein the transponder reader is portable and operable within the secure area.

9. A security system according to claim 1, wherein the transponder reader has a predetermined interrogation range such that a transponder within the interrogation range will receive an interrogation signal from the reader and will respond thereto by sending its unique identifier, and so determine the location of the transponder.

10. A security system according to claim 1, wherein the security processor, from consultation of the access database, determines what, if any, action needs to be taken.

11. A security system according to claim 1, further comprising an actuator controllable by the security processor to affect operation of a device in response to a condition determined by the security processor.

12. A security system according to claim 8, wherein the device activated by the actuator is selected from the group consisting of: an image capture device; an alarm; an alert system; a lock; an emergency door release; a speaker; and a communication device.

13. A security system according claim 1, wherein the transponder is configured as a card having a contact terminal.

14. A security system according to claim 13, wherein a card reader/writer is provided having a contact region compatible with the card contact terminal, wherein the transponder is addressable by the card reader when the terminal and contact region are in contact with one another.

15. A security system according to claim 14, wherein the card reader/writer is operable to write the replacement unique identifier to the transponder.

16. A security system according to claim 14, wherein the card reader/writer is integrated with an identification authentication device so as to authenticate the identity of a carrier of the transponder prior to writing a replacement unique identifier to the transponder of the carrier.

17. A security system according to claim 1, wherein the carrier is selected from the group consisting of: personnel; a vehicle; and a hardware product.

18. A security system according to claim 1, wherein the unique identifier has an expiry time after which the unique identifier is no longer valid.

19. A security system according to claim 1, wherein communication between at least some of the components of the system is enabled by one or more of the Internet, wireless connection, hardwire connection and, intranet.

20. A security system according to claim 1 wherein the transponder reader further includes a motion detector, such that on detection of movement within a detection zone, the transponder reader sends an interrogation signal to determine an identity of a user causing the movement.

21. A method of identity verification within a secure area, said secure area including regions requiring different access authority, the method comprising the steps of:
   interrogating an RF transponder with an interrogation signal from a transponder reader within a region of said secure area;
   receiving a unique identifier from the transponder provided in response to the interrogation signal;

providing a security processor having an access database setting out access parameters for the secure area and a carrier of a transponder, sending information from the transponder reader to the security processor, said information comprising at least the unique identifier of an interrogated transponder and the location of the transponder reader;

determining, from consultation of the access database, whether the carrier is positively authorized to be in the region corresponding to the interrogating transponder reader, and;

if positively authorized, sending a replacement unique identifier to the transponder, the transponder replacing the identifier in the transponder memory with the replacement identifier.

22. A security system according to claim 16 wherein the identification authentication device includes any one or a combination of: a keypad to receive an alphanumeric code or biometric authenticator, such as a finger print or retinal scanner.

* * * * *